(12) United States Patent
Takahashi

(10) Patent No.: US 7,257,010 B2
(45) Date of Patent: Aug. 14, 2007

(54) POWER SUPPLY CIRCUIT

(75) Inventor: Yukio Takahashi, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 228 days.

(21) Appl. No.: 11/173,488

(22) Filed: Jul. 1, 2005

(65) Prior Publication Data

US 2006/0007716 A1     Jan. 12, 2006

(30) Foreign Application Priority Data

Jul. 9, 2004    (JP) ............................ 2004-203776

(51) Int. Cl.
*H02M 5/42* (2006.01)
*H02M 7/04* (2006.01)
*H02M 7/68* (2006.01)

(52) U.S. Cl. .......................... 363/89; 363/70; 363/81; 363/84; 363/126; 363/127

(58) Field of Classification Search ................. 363/70, 363/81, 84, 89, 125, 126, 127, 53
See application file for complete search history.

(56) References Cited

U.S. PATENT DOCUMENTS

2004/0047167 A1*  3/2004  Prasad et al. ............... 363/125

FOREIGN PATENT DOCUMENTS

JP        2001-286149         10/2001
JP        2001286149 A    *   10/2001

* cited by examiner

*Primary Examiner*—Karl Easthom
*Assistant Examiner*—Ramy Ramadan
(74) *Attorney, Agent, or Firm*—SoCal IP Law Group LLP; Steven C. Sereboff

(57) ABSTRACT

A power supply circuit comprises a bridge circuit that has four rectifier elements connected and produces a rectified voltage between a positive side output terminal and a negative side output terminal of the power supply circuit, two of the four rectifier elements being connected to the negative side output terminal, a current detection element with which to detect a current, a first switching element that is connected in series to the current detection element and together with the current detection element is connected in parallel with one of the two rectifier elements, and a second switching element that is connected in series to the current detection element and together with the current detection element is connected in parallel with the other of the two rectifier elements. Based on a result of detecting with the current detection element, switching timings of the first and second switching elements are controlled.

7 Claims, 9 Drawing Sheets

POWER SUPPLY CIRCUIT

CROSS-REFERENCE TO RELATED APPLICATIONS

The present application claims priority from Japanese patent application No. 2004-203776 filed on Jul. 9, 2004, which is herein incorporated by reference.

BACKGROUND OF THE INVENTION

1. Field of the Invention

The present invention relates to a power supply circuit.

2. Description of the Related Art

As a power supply circuit for various electronic apparatuses, a power supply circuit that has a rectifier circuit (e.g., a diode bridge circuit) and a smoothing circuit (e.g., a condenser) and converts an alternating-current voltage into a direct-current voltage is known. However, such a power supply circuit is poor at power factor because, when an alternating voltage in the form of a sine wave is applied, a current flows through the power supply circuit only around the peak of the sine wave. Furthermore, where even with applying a sine wave alternating voltage, a current not proportional to a sine wave flows, harmonics that occur may affect adversely equipment around it.

Accordingly, a power supply circuit has been proposed wherein a switching element is connected in parallel with a diode and wherein by having the switching element switch at appropriate timings, the current flowing through the power supply circuit is made similar in shape to the sine wave of the alternating voltage, thereby improving power factor, suppressing harmonics, and adjusting the direct-current voltage. See, for example, Japanese Patent Application Laid-Open Publication No. 2001-286149.

FIG. 8 is a block diagram illustrating the configuration of a conventional power supply circuit. The conventional power supply circuit comprises four diodes D11, D12, D13, D14 forming a diode bridge circuit; a resistor R11 connected between the connection point of the anodes of the diodes D11, D12 and an N side electrode, the resistor R11 with which to detect the currents flowing through the diodes D11, D12; a switching element 114 connected in parallel with the diode D11 and the resistor R11; and a switching element 116 connected in parallel with the diode D12 and the resistor R11. Note that the switching elements 114 and 116 are, for example, bipolar transistors.

An alternating voltage generated by an alternating current power supply 110 is applied to the connection point of the diodes D11, D13 via a reactor 112. Moreover, an alternating voltage generated by the alternating current power supply 110 is directly applied to the connection point of the diodes D12, D14.

Hereinafter, the alternating voltage input line from the alternating current power supply 110 to the connection point of the diodes D11, D13 is referred to as an R line, and the alternating voltage input line from the alternating current power supply 110 to the connection point of the diodes D12, D14 is referred to as an S line.

An alternating voltage input from the alternating current power supply 110 is full-wave-rectified by the diode bridge circuit (D11 to D14), and then is smoothed by a condenser 122 connected between a positive side electrode (hereinafter, called a P side electrode) and a negative side electrode (hereinafter, called the N side electrode), which act as the output.

Note that the timings when the switching elements 114 and 116 switch are controlled by a control circuit (not shown) based on the current flowing through the resistor R11.

FIG. 9 is a diagram for explaining the current flows in the conventional power supply circuit for when the alternating voltage is positive. When the alternating voltage is positive, the switching element 114 switches on/off, and thereby current paths are switched.

<<When the Switching Element 114 is On>>

When the alternating voltage on the R line is positive relative to the S line and the switching element 114 is on, a current flows through a path indicated by the dot-dashed line in FIG. 9, that is, a path from the R line (the reactor 112) to the switching element 114 to the resistor R11 to the diode D12 to the S line. During this period of time, energy is stored in the reactor 112.

<<When the Switching Element 114 is Off>>

When the alternating voltage on the R line is positive relative to the S line and the switching element 114 is off, the reactor 112 induces a current to flow in the same direction as the current direction for when the switching element 114 is on. Thus, a current flows through a path indicated by the broken line in FIG. 9, that is, a path from the R line (the reactor 112) to the diode D13 to the condenser 122 to the resistor R11 to the diode D12 to the S line. During this period of time, the energy stored in the reactor 112 is output to the condenser 122. The condenser 122 is charged, and a direct-current voltage generated between the P side electrode and the N side electrode (hereinafter, called a direct-current output voltage) is raised in voltage level.

FIG. 10 is a diagram for explaining the current flows in the conventional power supply circuit for when the alternating voltage is negative. When the alternating voltage on the R line is negative relative to the S line, the switching element 116 switches on/off, and thereby current paths are switched.

<<When the Switching Element 116 is On>>

When the alternating voltage on the R line is negative relative to the S line and the switching element 116 is on, a current flows through a path indicated by the dot-dashed line in FIG. 10, that is, a path from the S line to the switching element 116 to the resistor R11 to the diode D11 to the R line (the reactor 112). During this period of time, energy is stored in the reactor 112.

<<When the Switching Element 116 is Off>>

When the alternating voltage on the R line is negative relative to the S line and the switching element 116 is off, the reactor 112 induces a current to flow in the same direction as the current direction for when the switching element 116 is on. Thus, a current flows through a path indicated by the broken line in FIG. 10, that is, a path from the S line to the diode D14 to the condenser 122 to the resistor R11 to the diode D11 to the R line (the reactor 112). During this period of time, the energy stored in the reactor 112 is output to the condenser 122. The condenser 122 is charged, and the direct-current output voltage is raised in voltage level.

The timings of switching operation of the switching element 114 or 116 have been controlled based on the current flowing through the resistor R11 connected in series to the diodes D11, D12. By repeating the switching operation, the direct-current output voltage is raised, and the current flowing through the power supply circuit is regulated to become similar in shape to the sine wave of the alternating voltage.

In the conventional power supply circuit, the diode D11 and the resistor R11 are connected in series, and in parallel with them, the switching element 114 is connected. Furthermore, the diode D12 and the resistor R11 are connected in series, and in parallel with them, the switching element 116 is connected.

Hence, regardless of whether the alternating voltage is positive or negative and whether the switching elements 114, 116 are on or off, a current always flows through the resistor R11, which flows through the diode D11 or the diode D12.

Thus, with such a conventional power supply circuit, there is the problem that since a current always flows through the resistor R11, which flows through the diode D11 or the diode D12, power loss exists thus reducing efficiency. Moreover, when the alternating voltage starts to be input, a rush current to charge the condenser 122 at the output flows. Thus, there is also the problem that power capacity need be enlarged.

SUMMARY OF THE INVENTION

An object of the present invention is to provide a power supply circuit that, by controlling the switching timings of a switching element based on the current flowing through the current-detection resistor only during the time period when the switching element is on, reduces power loss by the current detection element and improves efficiency.

According to one aspect of the present invention, there is provided a power supply circuit comprising a bridge circuit that has four rectifier elements connected and produces a rectified voltage between a positive side output terminal and a negative side output terminal of the power supply circuit, two of the four rectifier elements being connected to the negative side output terminal, a current detection element with which to detect a current, a first switching element that is connected in series to the current detection element and together with the current detection element is connected in parallel with one of the two rectifier elements of the bridge circuit connected to the negative side output terminal, and a second switching element that is connected in series to the current detection element and together with the current detection element is connected in parallel with the other of the two rectifier elements of the bridge circuit connected to the negative side output terminal, wherein based on a result of detecting with the current detection element, switching timings of the first switching element and the second switching element are controlled.

According to the present invention, only during the time period when the first or second switching element connected in parallel with a rectifier element of the bridge circuit is on, a current flows through the current detection element, and based on the result of detecting with the current detection element, switching timings are controlled. Thus, power loss by the current detection element is reduced and efficiency is improved.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

===Whole Configuration===

Figure 1:
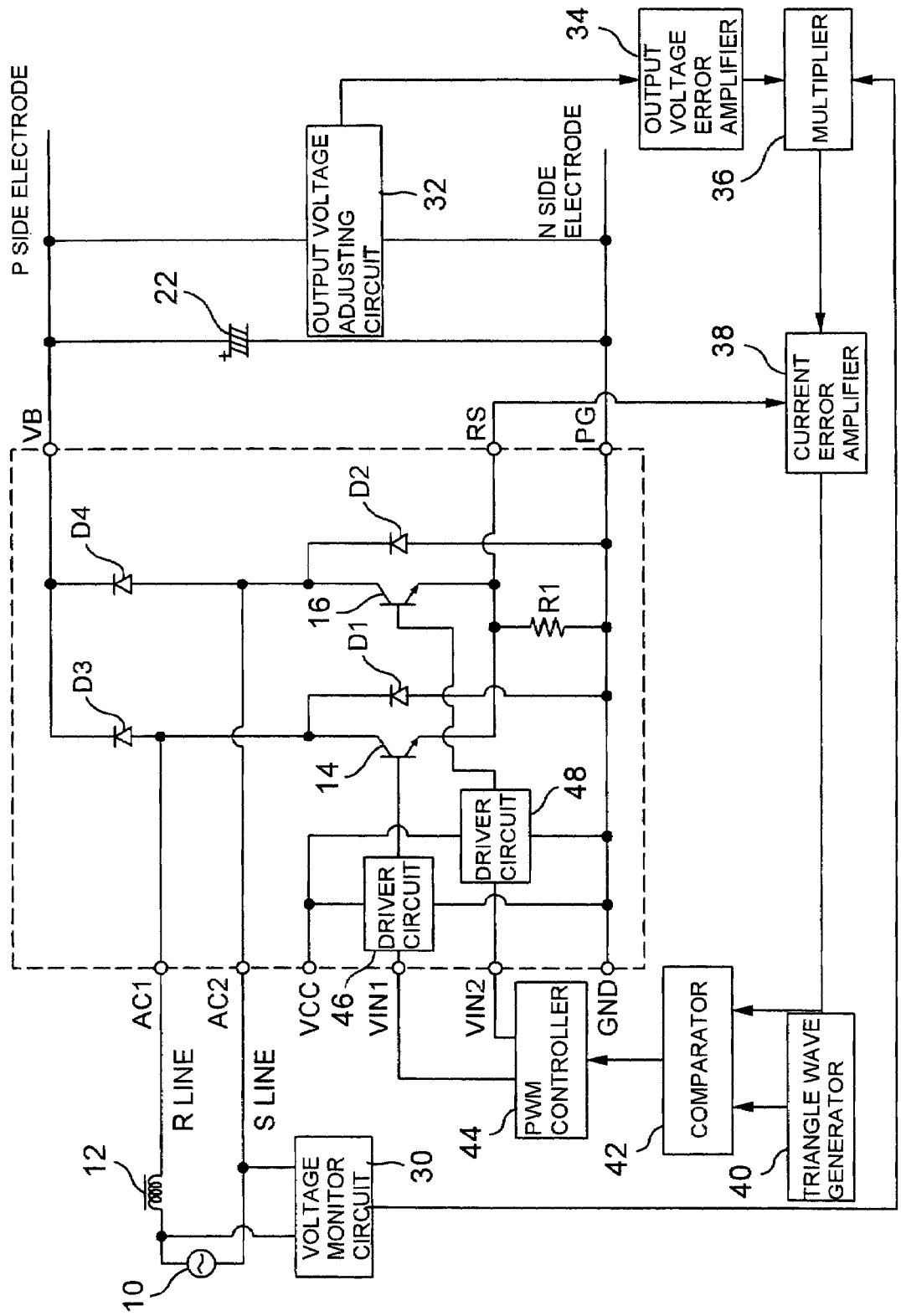
FIG. 1 is a block diagram illustrating an example of the configuration of a power supply circuit according to the present invention.

FIG. 1 is a block diagram illustrating an example of the configuration of a power supply circuit according to the present invention. This power supply circuit comprises four diodes D1, D2, D3, D4 forming a diode bridge circuit for full-wave-rectifying an alternating voltage, a resistor R1 for current detection (a "current detection element"), switching elements 14 and 16, and driver circuits 46 and 48. Note that the part enclosed by the broken line in FIG. 1 is integrated on, e.g., an insulated metal substrate. As shown in the Figure, provided thereon are an AC1 terminal, an AC2 terminal, a VCC terminal, a VIN1 terminal, a VIN2 terminal, a GND terminal, a VB terminal ("positive side output terminal"), an RS terminal, and a PG terminal ("negative side output terminal").

The line leading out the VB terminal is a positive side electrode (hereinafter called a P side electrode), and the line leading out the PG terminal is a negative side electrode (hereinafter called an N side electrode), between which a direct-current voltage is produced.

The diode D1 is connected between the AC1 terminal and the PG terminal.

The diode D2 is connected between the AC2 terminal and the PG terminal.

The diode D3 is connected between the AC1 terminal and the VB terminal.

The diode D4 is connected between the AC2 terminal and the VB terminal.

An alternating voltage from an alternating current power supply 10 is applied to the AC1 terminal via a reactor 12. Moreover, an alternating voltage from the alternating current power supply 10 is directly applied to the AC2 terminal. Hereinafter, the alternating voltage input line on the AC1 terminal side is referred to as an R line, and the alternating voltage input line on the AC2 terminal side is referred to as an S line.

Note that the reactor 12 is a coil such as a toroidal coil.

An alternating voltage applied by the alternating current power supply 10 is full-wave-rectified by the diodes D1, D2, D3, D4, and then is smoothed by a condenser 22 connected between the P side electrode and the N side electrode. Note that the reactor 12 may be provided on the S line side. In this case, an alternating voltage from the alternating current power supply 10 is applied to the AC2 terminal via the reactor 12, and an alternating voltage from the alternating current power supply 10 is directly applied to the AC1 terminal.

The switching element 14 is, for example, a transistor such as an insulated gate bipolar transistor (IGBT), and is connected in series to the resistor R1, and together with the resistor R1 is connected in parallel with the diode D1. Note that the switching element 14 and the diode D1 are connected in such orientations that currents opposite in direction flow through them respectively.

The switching element 16 is, for example, a transistor such as an insulated gate bipolar transistor (IGBT), and is connected in series to the resistor R1, and together with the resistor R1 is connected in parallel with the diode D2. Note that the switching element 16 and the diode D2 are connected in such orientations that currents opposite in direction flow through them respectively.

Note that a bipolar transistor or a MOSFET may be used as the switching elements 14, 16.

The resistor R1 is a shunt resistor for current detection having an extremely small resistance of about, e.g., 10 mΩ to 100 mΩ, and during the time period when either of the switching elements 14 and 16 is on, the current flowing through the diode D1 or D2 is detected.

The drive circuit 46 amplifies its input through the VIN1 terminal to such an amplitude as to be able to drive the switching element 14 by using voltage VCC applied through the VCC terminal and outputs the amplified input.

The drive circuit 48 amplifies its input through the VIN2 terminal to such an amplitude as to be able to drive the switching element 16 by using voltage VCC applied through the VCC terminal and outputs the amplified input.

The timings when the switching elements 14 and 16 are switched on/off are controlled by a control circuit, which comprises a voltage monitor circuit 30, an output voltage adjusting circuit 32, an output voltage error amplifier 34, a multiplier 36, a current error amplifier 38, a triangle wave generator 40, a comparator 42, and a PWM controller 44 as shown, for example, in the Figure.

The voltage monitor circuit 30 has input thereto the alternating voltage from the alternating current power supply 10 and outputs a sine wave reference waveform signal that is the alternating voltage full-wave-rectified.

The output voltage adjusting circuit 32 outputs a voltage obtained by dividing the voltage between the P side electrode and the N side electrode with, e.g., resistors (not shown), and can output an adjusted direct-current voltage divided into according to a given ratio by changing the resistances of the resistors.

The output voltage error amplifier 34 outputs an output voltage error signal produced by amplifying the difference between the output voltage of the output voltage adjusting circuit 32 and a predetermined target voltage.

The multiplier 36 has input thereto the sine wave reference waveform signal from the voltage monitor circuit 30 and the output voltage error signal from the output voltage error amplifier 34 and outputs an output voltage error amplified signal produced by multiplying them. The output voltage error amplified signal is according in sin wave amplitude to the output voltage error signal.

The current error amplifier 38 has input thereto an actual current signal detected in terms of voltage from the current flowing through the resistor R1 and the output voltage error amplified signal from the multiplier 36, and compares them and outputs a current error amplified signal produced by amplifying the difference between them.

The triangle wave generator 40 generates a triangle wave having a predetermined amplitude level and a predetermined period.

The comparator 42 has input thereto the triangle wave from the triangle wave generator 40 and the current error amplified signal from the current error amplifier 38, and compares them and outputs a PWM drive signal in a carrier frequency of, e.g., 20 kHz.

The PWM controller 44 has input thereto the PWM drive signal from the comparator 42, and outputs a signal to switch the switching element 14 to the VIN1 terminal during the time period when the alternating voltage is positive and a signal to switch the switching element 16 to the VIN2 terminal during the time period when the alternating voltage is negative.

Figure 5:
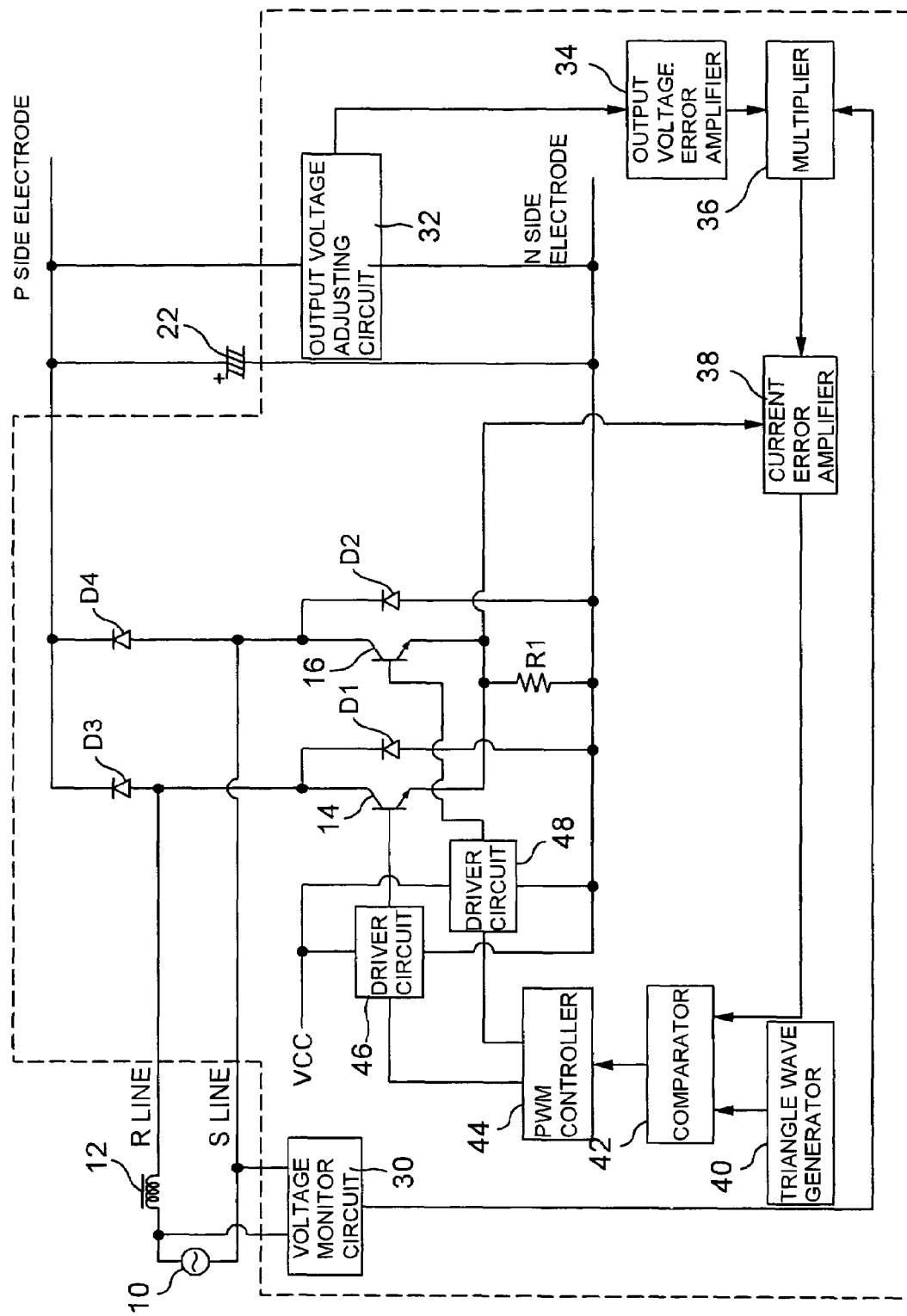
FIG. 5 is a block diagram illustrating the case where the parts except the alternating current power supply, the reactor, and the condenser are integrated.

Note that the control circuit comprising the voltage monitor circuit 30, the output voltage adjusting circuit 32, the output voltage error amplifier 34, the multiplier 36, the current error amplifier 38, the triangle wave generator 40, the comparator 42, and the PWM controller 44 may be integrated. FIG. 5 is a block diagram illustrating the case where the parts except the alternating current power supply 10, the reactor 12, and the condenser 22 are integrated (the terminates not being shown). In this case, the portion enclosed by the broken line in FIG. 5 is integrated, and thus the control circuit becomes smaller in chip area than in the case where the control circuit is made up of discrete parts as peripheral circuitry for the integrated circuit as shown in FIG. 1.

===Operation of the Control Circuit===

Figure 2:
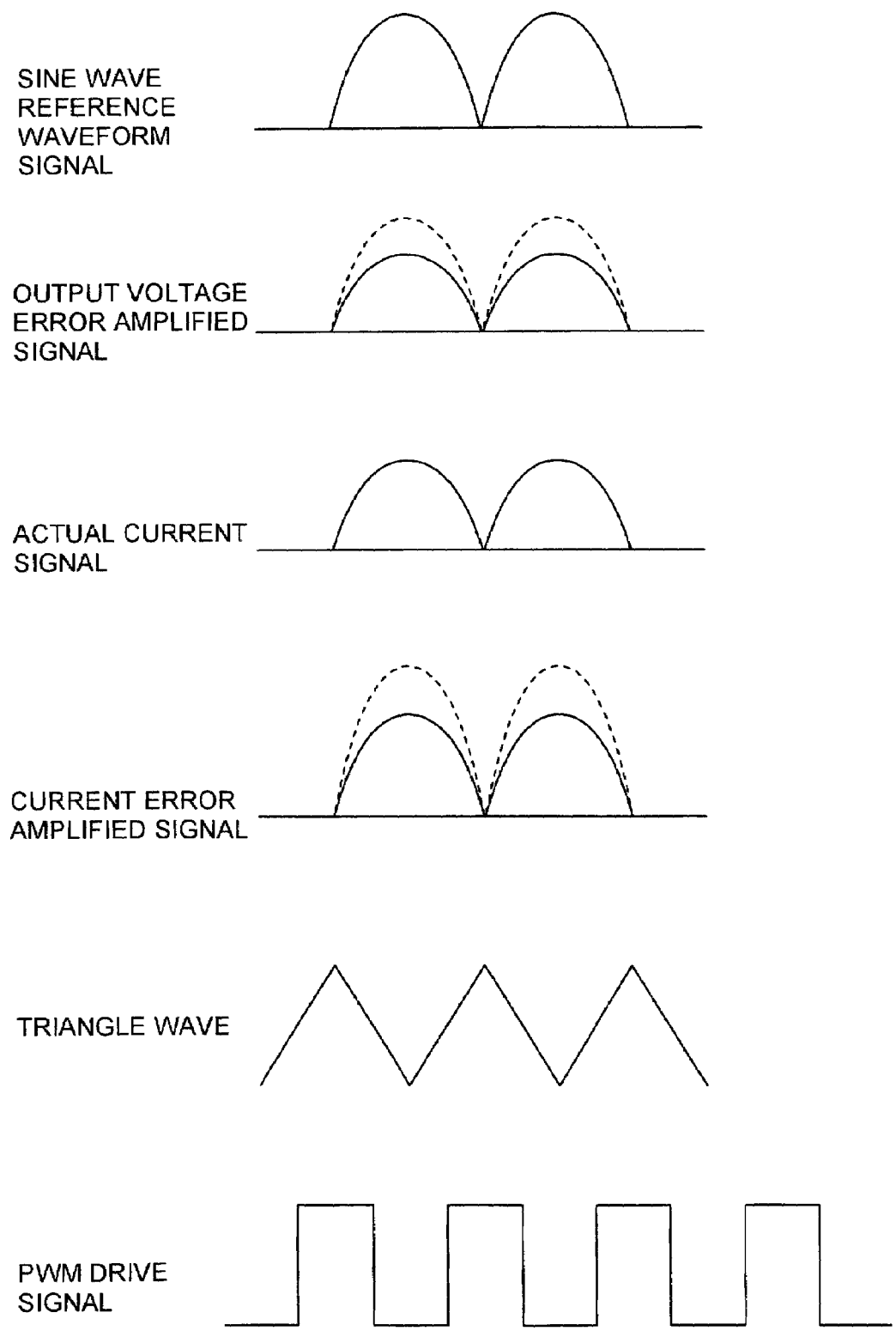
FIG. 2 is a diagram for explaining the operation of the control circuit.

The operation of the control circuit will be described with reference to the drawings. FIG. 2 is a diagram for explaining the operation of the control circuit.

First, the output voltage error amplifier 34 produces a voltage error signal obtained by amplifying the difference between the output voltage of the output voltage adjusting circuit 32 and a predetermined voltage, and the voltage monitor circuit 30 produces a sine wave reference waveform signal that is the alternating voltage from the alternating current power supply 10 full-wave-rectified. The voltage error signal and the sine wave reference waveform signal are multiplied in the multiplier 36, and the output voltage error amplified signal according in sin wave amplitude to the voltage error signal is produced.

This output voltage error amplified signal is compared by the current error amplifier 38 with an actual current signal indicating in terms of voltage the current flowing through the resistor R1, and a current error amplified signal that is the difference between them amplified is produced. The actual current signal shown in FIG. 2 is peak voltages across the resistor R1 in the time period when the switching element 14 or 16 is on, which are joined by a line. That is, in each period of the actual current signal, the switching element 14 or 16 switches on/off several times.

The current error amplified signal is compared by the comparator 42 with the triangle wave output from the triangle wave generator 40 and a PWM drive signal is produced.

The PWM drive signal is input to the PWM controller 44 and then is output to the VIN1 terminal during the time period when the alternating voltage is positive and to the VIN2 terminal during the time period when the alternating voltage is negative.

Note that the PWM drive signal may be a signal that switches the switching elements 14 and 16 synchronously, or a signal that repeats switching one of the switching elements 14 and 16 during which keeping the other of the switching elements 14 and 16 to be off.

===Operation of the Power Supply Circuit===

Figure 3:
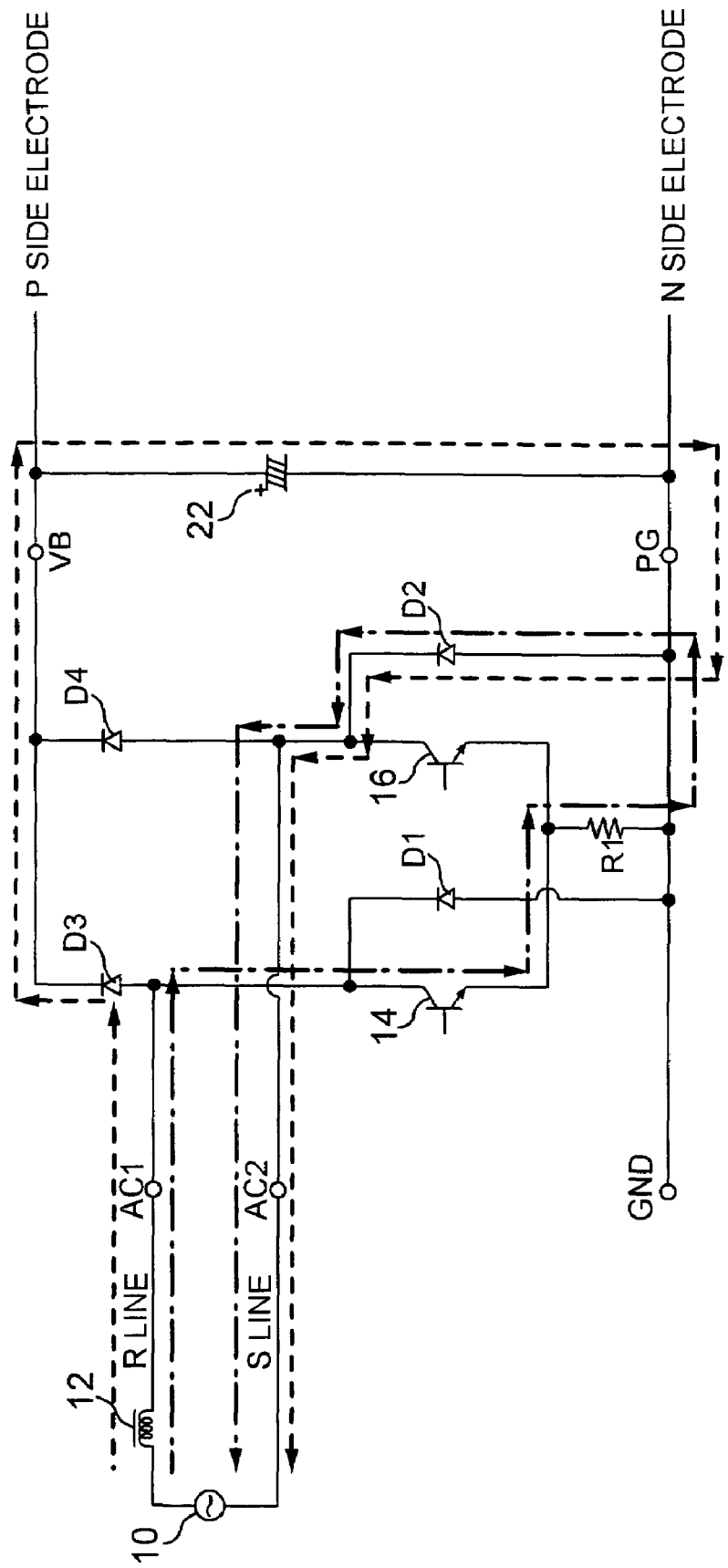
FIG. 3 is a diagram for explaining the operation of the power supply circuit for when the alternating voltage is positive.

Next, the operation of the power supply circuit of the present invention will be described with reference to the drawings. FIG. 3 is a diagram for explaining the operation of the power supply circuit for when with respect to the alternating voltage of the alternating current power supply 10, the R line is positive relative to the S line.

<<When the Switching Element 14 is On>>

When the alternating voltage on the R line is positive relative to the S line and the switching element 14 is on, a current flows through a path indicated by the dot-dashed line in FIG. 3, that is, a path from the R line (the reactor 12) to the AC1 terminal to the switching element 14 to the resistor R1 to the diode D2 to the AC2 terminal to the S line. During this period of time, energy is stored in the reactor 12.

<<When the Switching Element 14 is Off>>

When the alternating voltage on the R line is positive relative to the S line and the switching element 14 is off, the reactor 12 induces a current to flow in the same direction as the current direction for when the switching element 14 is on. Thus, a current flows through a path indicated by the broken line in FIG. 3, that is, a path from the R line (the reactor 12) to the AC1 terminal to the diode D3 to the VB terminal to the condenser 22 to the PG terminal to the diode D2 to the AC2 terminal to the S line, thereby charging the condenser 22.

During this period of time, the energy stored in the reactor 12 is output to the condenser 22. A direct-current voltage generated between the P side electrode and the N side electrode (hereinafter, called a direct-current output voltage) is raised in voltage level.

Figure 4:
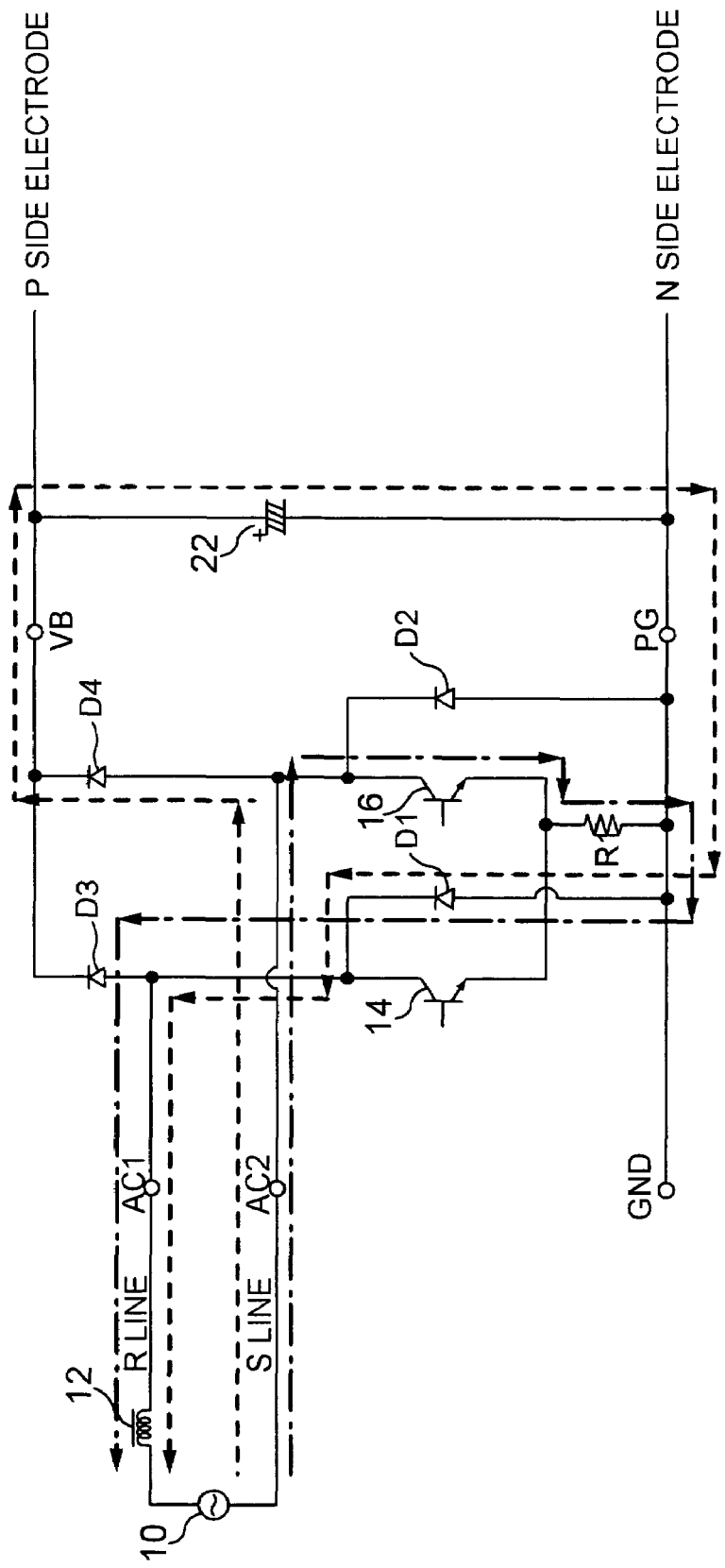
FIG. 4 is a diagram for explaining the operation of the power supply circuit for when the alternating voltage is negative.

FIG. 4 is a diagram for explaining the operation of the power supply circuit for when with respect to the alternating voltage of the-alternating current power supply 10, the R line is negative relative to the S line.

<<When the Switching Element 16 is On>>

When the alternating voltage on the R line is negative relative to the S line and the switching element 16 is on, a current flows through a path indicated by the dot-dashed line in FIG. 4, that is, a path from the S line to the AC2 terminal to the switching element 16 to the resistor R1 to the diode D1 to the AC1 terminal to the R line (the reactor 12). During this period of time, energy is stored in the reactor 12.

<<When the Switching Element 16 is Off>>

When the alternating voltage on the R line is negative relative to the S line and the switching element 16 is off, the reactor 12 induces a current to flow in the same direction as the current direction for when the switching element 16 is on. Thus, a current flows through a path indicated by the broken line in FIG. 4, that is, a path from the S line to the AC2 terminal to the diode D4 to the VB terminal to the condenser 22 to the PG terminal to the diode D1 to the AC1 terminal to the R line (the reactor 12), thereby charging the condenser 22.

During this period of time, the energy stored in the reactor 12 is output to the condenser 22. The direct-current output voltage is raised in voltage level.

As described above, the power supply circuit of the present invention is configured such that a current flows through the resistor R1 only when either of the switching elements 14 and 16 is on. Based on the current flowing through the resistor R1, the switching timings of the switching element 14 or 16 is controlled, and thereby the current flowing through the power supply circuit is made similar in shape to the sine wave of the alternating voltage, thus improving power factor.

Other Embodiments

Figure 6:
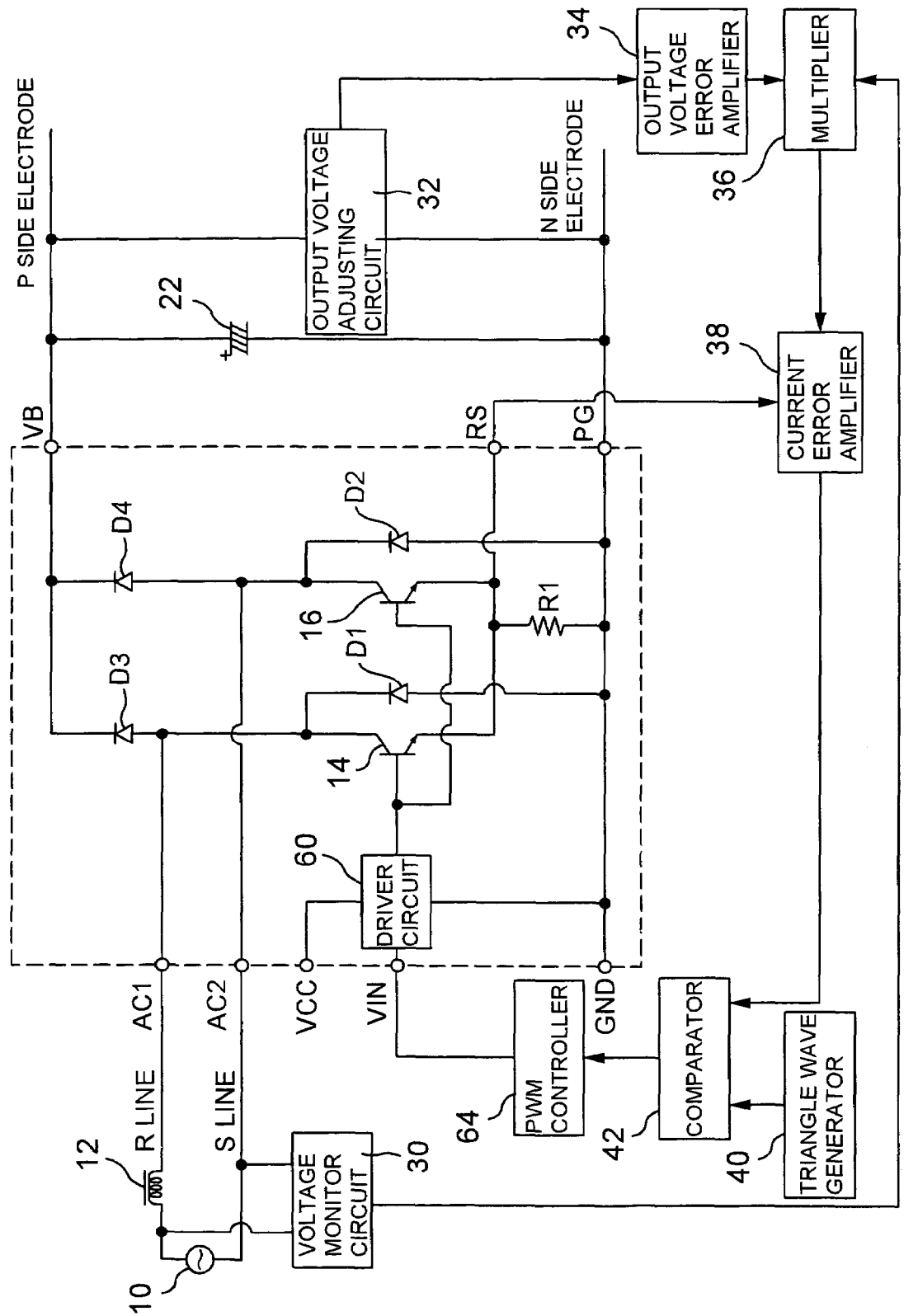
FIG. 6 is a block diagram for explaining a power supply circuit according to a second embodiment.

FIG. 6 is a block diagram for explaining a power supply circuit according to a second embodiment of the present invention. In the second embodiment, instead of switching complementarily, the switching elements 14 and 16 switch simultaneously. The basic configuration thereof is the same as in FIG. 1, and hence the same parts as in FIG. 1 are denoted by the same reference numerals with a description thereof omitted. Only the different parts than in FIG. 1 will be described below.

The power supply circuit of the Figure comprises a PWM controller 64 that has input thereto the PWM drive signal from the comparator 42 and that outputs a signal to switch the switching elements 14 and 16 to a VIN terminal at predetermined timings, for example, when the alternating voltage changes in polarity; a drive circuit 60 that amplifies its input through the VIN terminal to such an amplitude as to be able to drive the switching elements 14, 16 by using voltage VCC applied through the VCC terminal and outputs the amplified input.

The PWM drive signal input into the PWM controller 64 is then output to the drive circuit 60 via the VIN terminal as a signal to switch the switching elements 14 and 16. And, the output of the drive circuit 60 switches the switching elements 14 and 16 on simultaneously or off simultaneously.

When the switching elements 14 and 16 are switched on simultaneously, for example in FIG. 3, if the reverse-bias breakdown voltage of the switching element 16 is greater than the sum of the drop voltage across the resistor R1 and the forward drop voltage across the diode D2, a current flows through the same path as indicated by the dot-dashed line.

In FIG. 4, if the reverse-bias breakdown voltage of the switching element 14 is greater than the sum of the drop voltage across the resistor R1 and the forward drop voltage across the diode D1, a current flows through the same path as indicated by the dot-dashed line.

Thus, no problem occurs with switching the switching elements 14 and 16 on/off simultaneously where elements having a reverse-bias breakdown voltage no less than a predetermined value are used as the switching elements 14 and 16.

As such, in the second embodiment of the present invention, the switching elements 14 and 16 are switched simultaneously. Since switching the switching elements 14 and 16 on/off simultaneously, there is no need to switch between switching of the switching element 14 and switching of the switching element 16 according to the polarity of the alternating voltage generated by the alternating current power supply 10, and hence the circuit configuration and the control method can be simplified. Note that without providing the PWM controller 64, the PWM drive signal may be directly input to the drive circuit 60.

Figure 7:
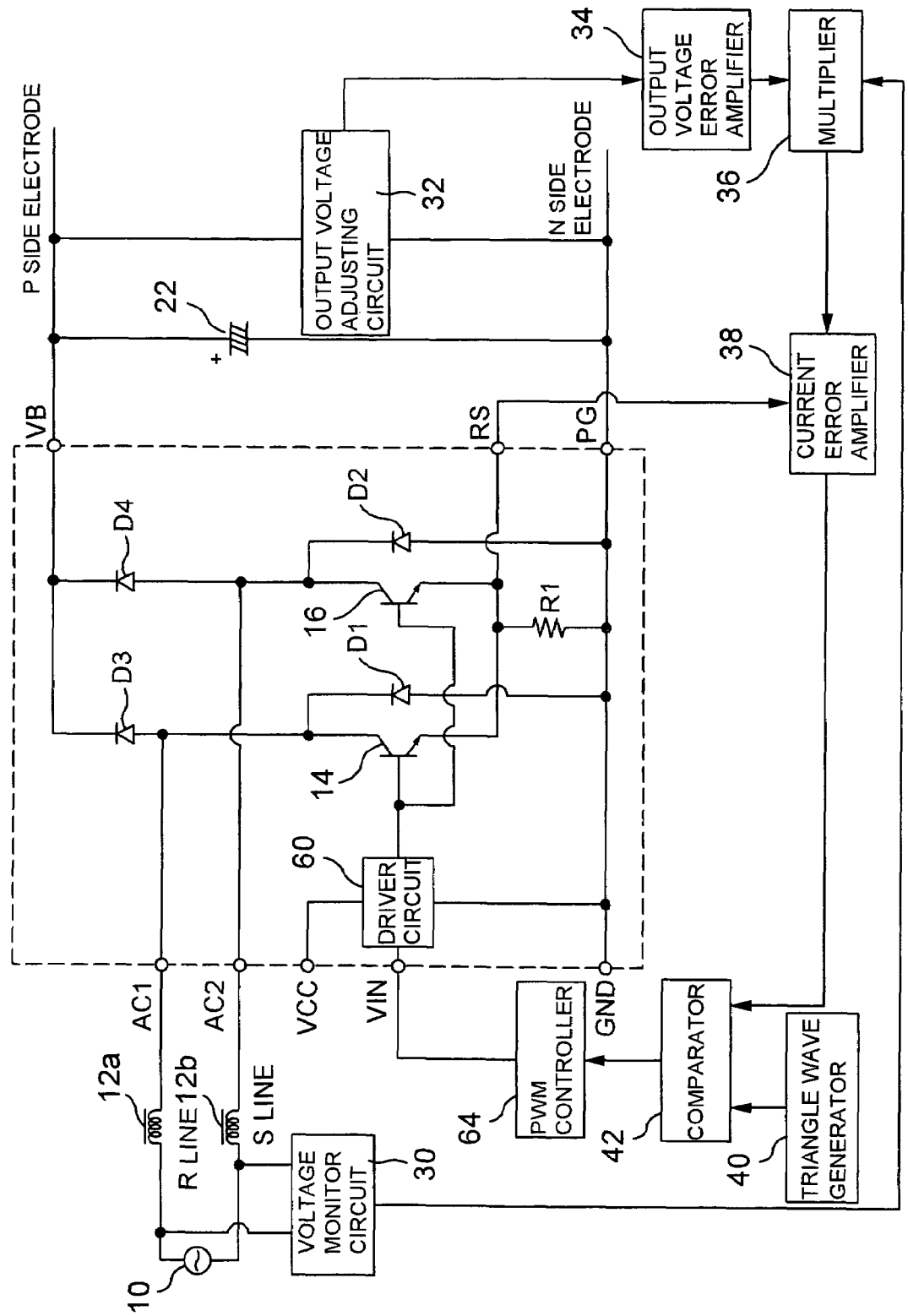
FIG. 7 is a block diagram for explaining a power supply circuit according to a third embodiment.
Figure 8:
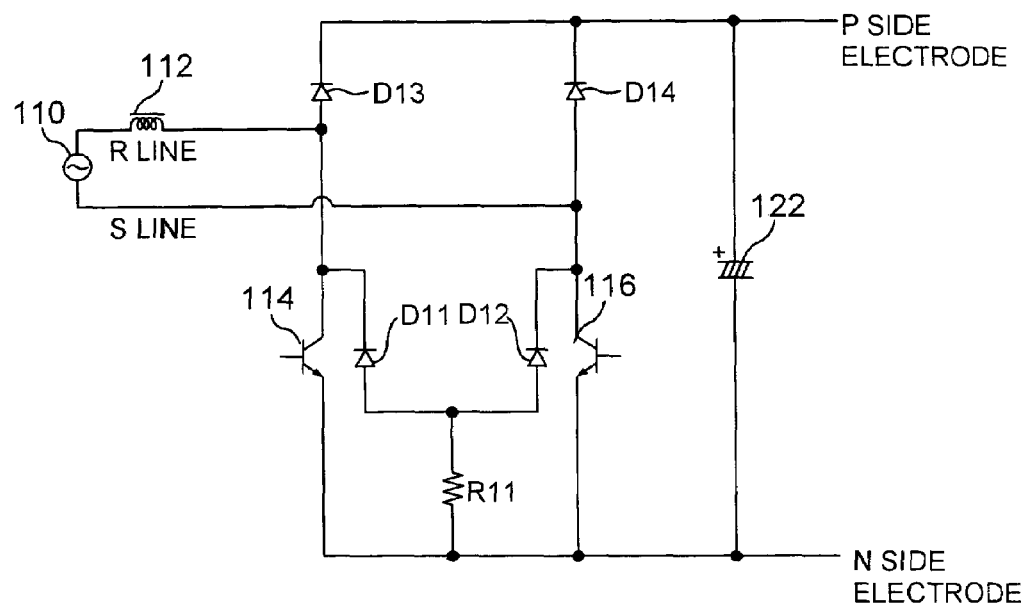
FIG. 8 is a block diagram illustrating an example of the configuration of a conventional power supply circuit.
Figure 9:
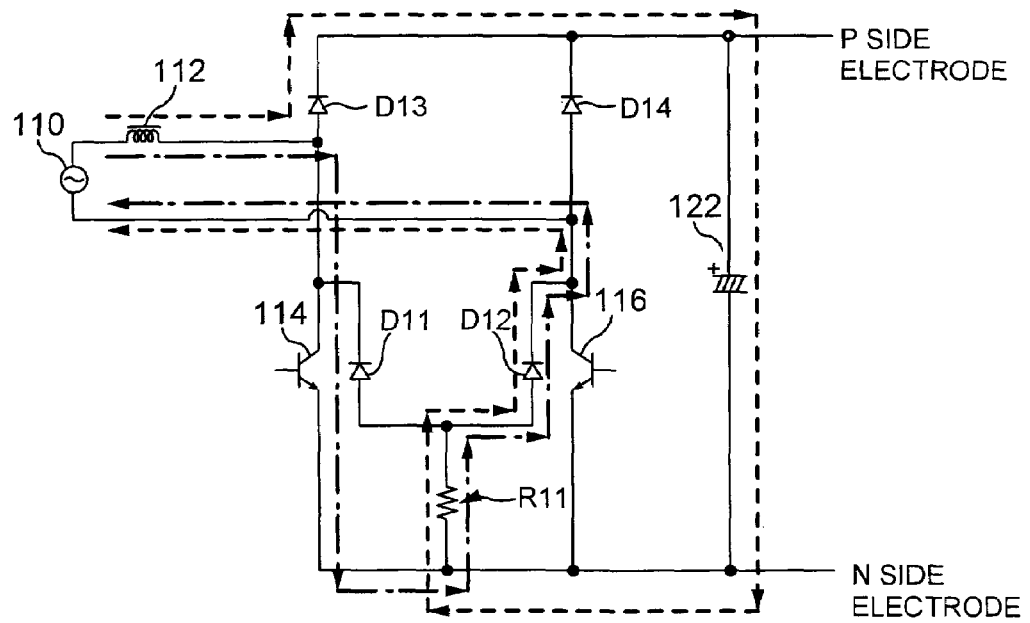
FIG. 9 is a diagram for explaining the operation of the conventional power supply circuit for when the alternating voltage is positive.
Figure 10:
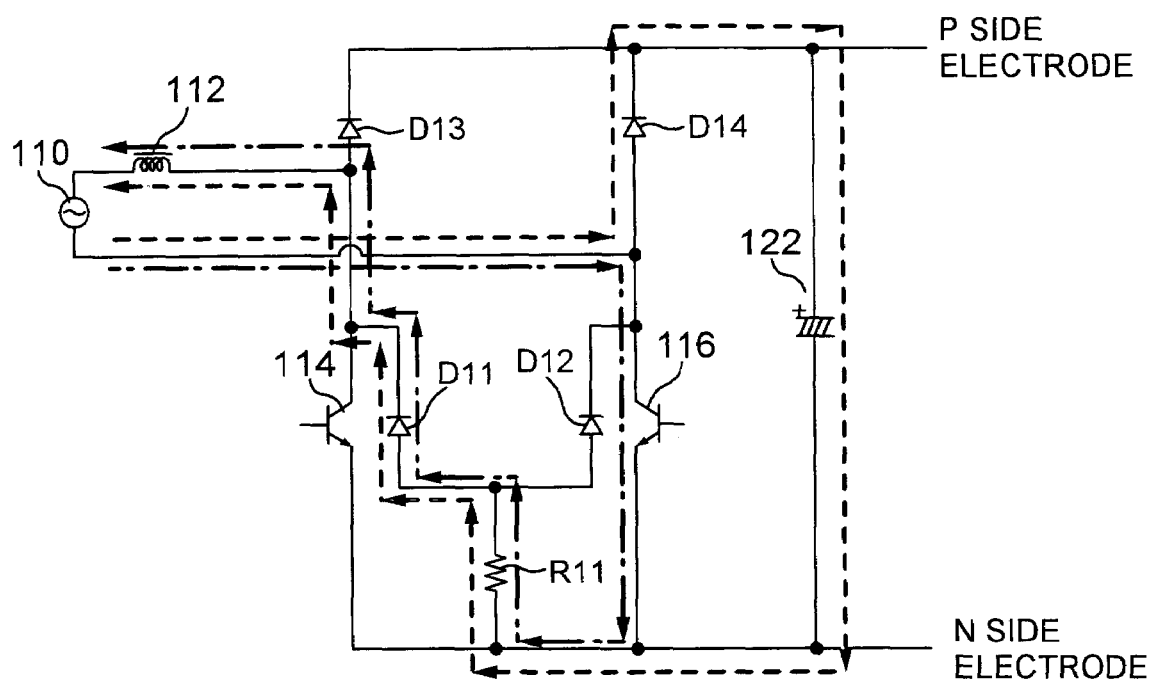
FIG. 10 is a diagram for explaining the operation of the conventional power supply circuit for when the alternating voltage is negative.

FIG. 7 is a block diagram for explaining a power supply circuit according to a third embodiment of the present invention. The basic configuration thereof is the same as in FIG. 6 of the second embodiment, and hence the same parts as in FIG. 6 are denoted by the same reference numerals with a description thereof omitted. Only the different parts than in FIG. 6 will be described below. In the third embodiment, the alternating voltage on the R line is applied to the AC1 terminal via a reactor 12a and at the same time the alternating voltage on the S line is applied to the AC2 terminal via a reactor 12b.

The operation of the third embodiment with this configuration will be described below.

When the alternating voltage is positive, during the time period that the switching element 14 is on, a current flows through the same path as indicated by the dot-dashed line in FIG. 3, and energy is stored in the reactors 12a and 12b. On the other hand, during the time period that the switching element 14 is off, a current flows through the same path as indicated by the broken line in FIG. 3, and the energy stored in the reactors 12a and 12b is output to the condenser 22 side.

When the alternating voltage is negative, during the time period that the switching element 16 is on, a current flows through the same path as indicated by the dot-dashed line in FIG. 4, and energy is stored in the reactors 12a and 12b. On the other hand, during the time period that the switching element 16 is off, a current flows through the same path as indicated by the broken line in FIG. 4, and the energy stored in the reactors 12a and 12b is output to the condenser 22 side.

By repeating the above operations, the current flowing through the power supply circuit is regulated to become similar in shape to the sine wave of the alternating voltage. Note that the other operations are the same as in the second embodiment.

The reactors 12a and 12b provided in the R line and the S line respectively act as a common mode choke coil as well. Hence, compared with the case where the reactor 12 is provided in one of the alternating voltage input lines, a noise reduction rate thereof is larger, and thus, the noise filter can be made smaller.

As described above, in the power supply circuit of the present invention, only during the time period when the switching element 14 or 16 is on, a current flows through the resistor R1, and based on the result of detecting the current, the on-time of the switch is controlled. Hence, power consumption by the resistor R1 can be reduced, and efficiency can be improved. Furthermore, since the current flowing through the switching element 14 or 16 is directly controlled, the destruction of the switching element 14 or 16 by an excessive current can be prevented. Yet further, since only the on-current in the switching element 14 or 16 is detected with the resistor R1, a current protection level for protecting the switching element 14 or 16 from an excessive current can be set independently, appropriately for each of the switching elements 14 and 16. In the conventional power supply circuit, since the current flowing through the diode D11 or D12 is also detected, the current protection level cannot be set to be at or below the peak of the alternating input current. On the other hand, in the power supply circuit of the present invention, since only the current flowing through the switching element 14 or 16 is detected, the current protection level can be set to be at or below the peak of the alternating input current. Therefore, elements small in allowable current can be used as the switching elements 14 and 16, and thus the circuit can be made smaller and made at low cost.

Moreover, while for the switching elements 14 and 16, each half cycle is a switching control period of time or an off-period of time depending on the polarity of the alternating input voltage, the current flowing through the power supply circuit can be made similar in shape to the sine wave of the alternating voltage, thereby suppressing harmonics, and improving power factor. Alternatively, where the switching elements 14 and 16 are switched simultaneously, the polarity of the input need not be determined and thus the circuit configuration and the control method can be simplified.

By providing the reactor 12 in one of the R line and the S line and switching the switching element 14 or 16, the direct-current output voltage can be raised in voltage level. When the reactors 12a and 12b are provided in the R line and the S line respectively, they act as a common mode choke coil as well, and thus the noise filter can be made smaller.

Furthermore, by using the resistor R1 in the circuit detecting the current, the current detecting circuit can be made smaller and made at low cost. Yet further, by configuring such that a current flows through the resistor R1 only when the switching element 14 or 16 is on, power consumption can be reduced.

In the present invention, only when the switching element 14 or 16 is on, the current is detected. Hence, a rush current that flows to charge the condenser 22 when the alternating voltage starts to be input need not be considered, and hence the resistor R1 of a small power capacity can be used as the current detection element. Thus, the current detecting circuit can be made smaller and made at low cost.

Moreover, by integrating the diodes D1, D2, D3, D4, the switching elements 14, 16, and the resistor R1 on an insulated metal substrate, electromagnetic compatibility noise (EMC noise) can be suppressed. Further, the voltage monitor circuit 30, the output voltage adjusting circuit 32, the output voltage error amplifier 34, the multiplier 36, the current error amplifier 38, the triangle wave generator 40, the comparator 42, and the PWM controller 44, which form the control circuit, can be integrated on the same chip. In this case, the control circuit becomes smaller in chip area than in the case where the control circuit is made up of discrete parts.

Although the preferred embodiments of the present invention have been described, the above embodiments are provided to facilitate the understanding of the present invention and not intended to limit the present invention. It should be understood that various changes and alterations can be made therein without departing from spirit and scope of the invention.

What is claimed is:

1. A power supply circuit comprising:
    a bridge circuit that has four rectifier elements connected and produces a rectified voltage between a positive side output terminal and a negative side output terminal of the power supply circuit, two of the four rectifier elements being connected to the negative side output terminal;
    a current detection element with which to detect a current;
    a first switching element that is connected in series to the current detection element and together with the current detection element is connected in parallel with one of the two rectifier elements of the bridge circuit connected to the negative side output terminal; and a second switching element that is connected in series to the current detection element and together with the current detection element is connected in parallel with the other of the two rectifier elements of the bridge circuit connected to the negative side output terminal, wherein based on a result of detecting with the current detection element, switching timings of the first switching element and the second switching element are controlled.

2. The power supply circuit according to claim 1, wherein the first switching element and the second switching element switch complementarily to each other.

3. The power supply circuit according to claim 1, wherein the first switching element and the second switching element are controlled to switch simultaneously based on the result of detecting with the current detection element.

4. The power supply circuit according to claim 1, wherein an alternating voltage is applied via a reactor to one of alternating voltage input lines of the bridge circuit.

5. The power supply circuit according to claim 1, wherein the current detection element is a resistor element.

6. The power supply circuit according to claim 1, which is integrated on an insulated metal substrate.

7. A power supply circuit comprising:

a bridge circuit that has four rectifier elements connected and produces a rectified voltage between a positive side output terminal and a negative side output terminal of the power supply circuit, two of the four rectifier elements being connected to the negative side output terminal;

a current detection element with which to detect a current;

a first switching element that is connected in series to the current detection element and together with the current detection element is connected in parallel with one of the two rectifier elements of the bridge circuit connected to the negative side output terminal;

a second switching element that is connected in series to the current detection element and together with the current detection element is connected in parallel with the other of the two rectifier elements of the bridge circuit connected to the negative side output terminal; and a control circuit that controls switching timings of the first switching element and the second switching element based on a result of detecting with the current detection element.

* * * * *